United States Patent
Bandi et al.

(10) Patent No.: US 10,957,192 B2
(45) Date of Patent: Mar. 23, 2021

(54) SYSTEMS AND METHODS FOR DISPLAYING VISUAL CONTENT IN AN AUTOMOBILE STOPPED AT A TRAFFIC LIGHT

(71) Applicant: Ford Global Technologies, LLC, Dearborn, MI (US)

(72) Inventors: Krishna Bandi, Farmington Hills, MI (US); Samer Ibrahim, Dearborn, MI (US); Richard Ortman, Saline, MI (US)

(73) Assignee: Ford Global Technologies, L.L.C, Dearborn, MI (US)

( * ) Notice: Subject to any disclaimer, the term of this patent is extended or adjusted under 35 U.S.C. 154(b) by 0 days.

(21) Appl. No.: 16/536,927

(22) Filed: Aug. 9, 2019

(65) Prior Publication Data
US 2021/0043083 A1    Feb. 11, 2021

(51) Int. Cl.
*G08G 1/0967* (2006.01)
*H04W 4/44* (2018.01)
*G06F 3/14* (2006.01)
*G06F 3/0481* (2013.01)

(52) U.S. Cl.
CPC ............. *G08G 1/0967* (2013.01); *G06F 3/14* (2013.01); *H04W 4/44* (2018.02); *G06F 3/04817* (2013.01)

(58) Field of Classification Search
CPC .............................................. G08G 1/096758
See application file for complete search history.

(56) References Cited

U.S. PATENT DOCUMENTS

| | | |
|---|---|---|
| 5,982,298 A | 11/1999 | Lappenbusch et al. |
| 6,396,417 B2 | 5/2002 | Lee |
| 9,210,589 B2 | 12/2015 | Panta et al. |
| 9,928,738 B2 | 3/2018 | Bauer et al. |
| 10,019,901 B1 | 7/2018 | Fields et al. |
| 10,083,607 B2 | 9/2018 | Ginsberg et al. |
| 10,198,942 B2 | 2/2019 | Ginsberg et al. |
| 2003/0187570 A1* | 10/2003 | Impson ............ G08G 1/096716 701/117 |

(Continued)

FOREIGN PATENT DOCUMENTS

JP    2009-245326 A    10/2009

*Primary Examiner* — Joseph H Feild
*Assistant Examiner* — Pameshanand Mahase
(74) *Attorney, Agent, or Firm* — Brandon Hicks; Eversheds Sutherland (US) LLP

(57) ABSTRACT

Exemplary embodiments described in this disclosure are generally directed to systems and methods for displaying visual content in an automobile. In an exemplary implementation, an onboard computer of an automobile receives wireless signals from a roadside unit located near the traffic intersection. The wireless signals provide information about how much time is remaining before a traffic light turns from a red state to a green state. The onboard computer uses this information to display visual content on an infotainment system in the automobile as long as the automobile is in a stopped condition. The onboard computer stops displaying the content before the traffic light turns green. In one case, the wireless signals transmitted from the roadside unit include a Signal Phase and Timing (SPaT) signal and a traffic intersection map that provides details about a topography of the traffic intersection.

18 Claims, 4 Drawing Sheets

(56) References Cited

U.S. PATENT DOCUMENTS

| | | | |
|---|---|---|---|
| 2005/0104745 A1* | 5/2005 | Bachelder | F41G 9/00 340/906 |
| 2010/0007523 A1* | 1/2010 | Hatav | G01C 21/26 340/901 |
| 2010/0245124 A1 | 9/2010 | Bai et al. | |
| 2010/0250346 A1 | 9/2010 | Bai et al. | |
| 2011/0018701 A1* | 1/2011 | Mizuno | G08G 1/07 340/438 |
| 2011/0081973 A1 | 4/2011 | Hall | |
| 2012/0026014 A1* | 2/2012 | Miller | G08G 1/07 340/929 |
| 2013/0166109 A1* | 6/2013 | Ginsberg | G08G 1/0967 701/2 |
| 2016/0349066 A1* | 12/2016 | Chung | G01C 21/3415 |
| 2017/0032402 A1* | 2/2017 | Patsiokas | G06Q 30/0207 |
| 2018/0012091 A1* | 1/2018 | Ricci | G07B 15/063 |
| 2018/0075739 A1* | 3/2018 | Ginsberg | G08G 1/096783 |

* cited by examiner

SYSTEMS AND METHODS FOR DISPLAYING VISUAL CONTENT IN AN AUTOMOBILE STOPPED AT A TRAFFIC LIGHT

FIELD OF THE DISCLOSURE

This disclosure generally relates to in-vehicle displays, and more particularly relates to systems and methods for operating in-vehicle displays.

BACKGROUND

Most automobiles now include various types of devices that are intended to enhance driving safety and/or to offer more functionalities. For example, a wireless communication device such as a Bluetooth® telephone system allows a driver to keep his/her hands on the steering wheel and eyes on the road. As another example, an infotainment system may be used not only for listening to music (as was done in the past by using a radio), but for additional purposes such as for obtaining navigation instructions, to look up a phone number in a phone directory, or to watch some types of video content. Certain actions performed by a driver of the automobile may include a need to look at a display screen of the infotainment system and/or to touch an icon on a touch screen of the infotainment system.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
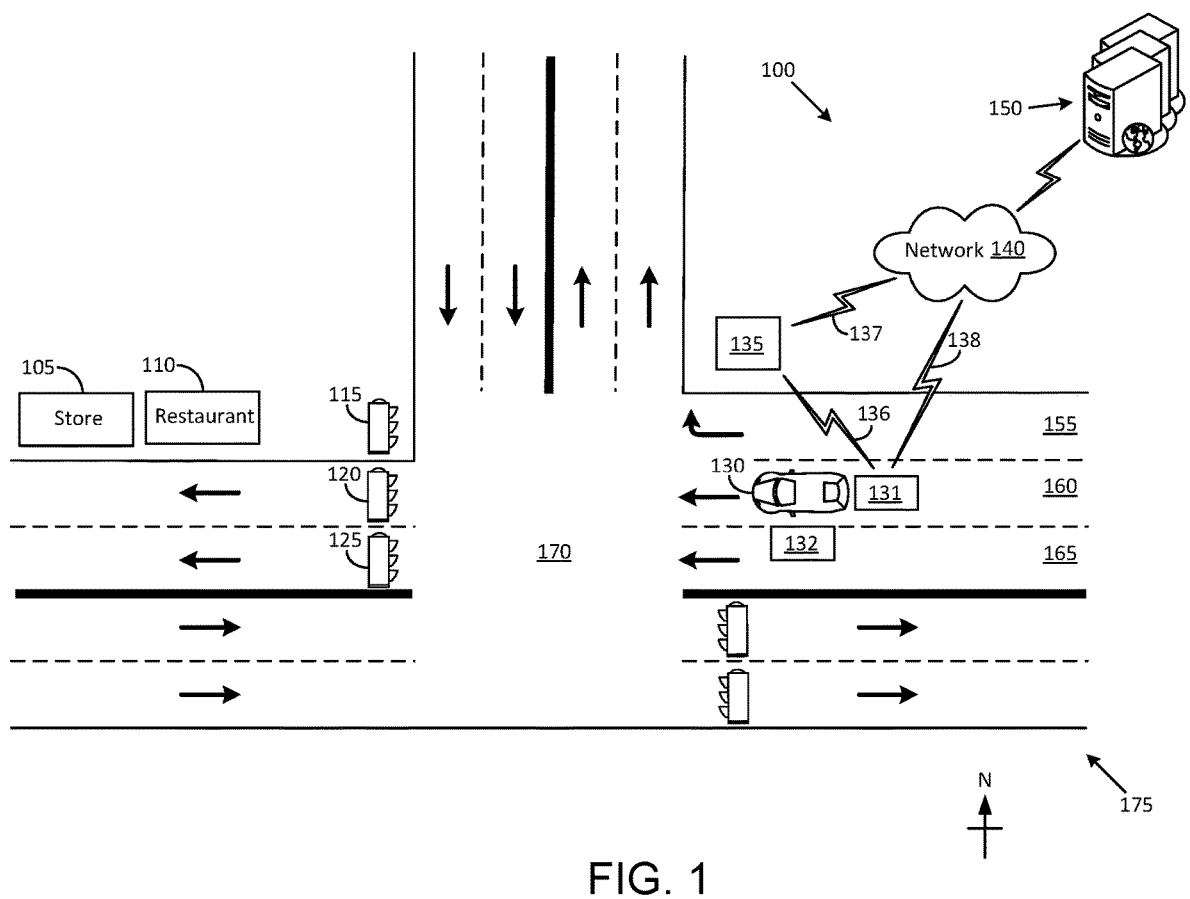
FIG. 1 shows an exemplary embodiment of a system for displaying visual content on one or more devices provided in an automobile, in accordance with the disclosure.

In terms of a general overview, certain embodiments described in this disclosure are generally directed to systems and methods for displaying visual content in an automobile. In an exemplary implementation, an onboard computer of an automobile receives wireless signals from a roadside unit located near the traffic intersection. The wireless signals provide information about how much time is remaining before a traffic light turns from a red state to a green state. The onboard computer uses this information to display visual content (such as, for example, a notification, an image, or a video clip) on an infotainment system in the automobile, as long as the automobile is in a stopped condition. The onboard computer stops displaying the content just before the traffic light turns green. In one case, the wireless signals transmitted from the roadside unit include a Signal Phase and Timing (SPaT) signal that provides traffic light timing information and a traffic intersection map that provides details about a topography of the traffic intersection.

ILLUSTRATIVE EMBODIMENTS

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "server computer" as used in this disclosure refers to one or more of various types of computers that may be located in various places for carrying out various kinds of data processing functions. Words such as "vehicle" and "automobile" may be used in an interchangeable manner. Words such as "wireless" or "wirelessly" as used herein are not intended to preclude other forms of communication such as optical communications and wired communications. The examples provided herein encompass such alternative communication technologies. Furthermore, it should be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

FIG. 1 shows a first exemplary embodiment of a system 100 for displaying visual content on one or more devices provided in an automobile in accordance with the disclosure. The exemplary system 100 can include a roadside unit 135 that can wirelessly communicate with onboard computers of various automobiles that may be stopped or moving near a traffic intersection 170. In an exemplary scenario that is illustrated in FIG. 1, the roadside unit 135 is communicatively coupled to a server computer 150 and one or both of the roadside unit 135 and the server computer 150 can wirelessly communicate with an onboard computer 131 provided in an automobile 130 that is currently stopped at the traffic intersection 170. The automobile 130 is traveling west and is in a stopped condition in a lane 160 of a multi-lane road 175 because a traffic light 120 corresponding to the lane 160 is in a red state. A traffic light 125 corresponding to an adjacent lane 165 would also typically be in a red state. A traffic light 115 that corresponds to a right-turn only lane 155 may independently signal either a green turn state or a red state when the traffic light 120 and the traffic light 125 are each in a red state.

The onboard computer 131 can include an engine controller (not shown) that controls various operations of the automobile 130 (such as fuel injection, speed control, braking, cruise control, etc.) and can also include a communications system such as a vehicle-to-everything (V2X) communication system. The communications system (not shown) may allow the onboard computer 131 to communicate with various devices such as, for example, the roadside unit 135, the server computer 150, an infotainment system 132 in the automobile 130, and/or a personal device carried by an occupant of the automobile 130. The onboard computer 131 may communicate with the roadside unit 135 using a wireless link 136 operating on a communication protocol such as, for example, an infrastructure-to-vehicle protocol (I2V) protocol, a vehicle-to-everything (V2X) protocol, a Wi-Fi protocol, a Bluetooth® protocol, or any machine-to-machine protocol.

The onboard computer 131 may be communicatively coupled to the network 140 by a wireless link 138 that provides communicative coupling between the onboard computer 131 and one or more devices that may be part of the network 140 (such as a router, for example). The network 140 may include any one or combination of networks, such as a local area network (LAN), a wide area network (WAN), a telephone network, a cellular network, a cable network, a wireless network, and/or private/public networks such as the Internet. In some instances, the network 140 may support communication technologies such as Bluetooth®, cellular, near-field communication (NFC), Wi-Fi, Wi-Fi direct, machine-to-machine communication, and/or man-to-machine communication.

The infotainment system 132 can include an audio system and a video system. Visual content such as messages, images, and video clips may be presented by the video system upon a display screen of the infotainment system 132. An occupant of the automobile 130 may use the infotainment system 132 for various purposes such as to listen to music, to participate in a phone call, to look at a navigation map, and/or to watch a video.

A few examples of a personal device carried by an occupant of the automobile 130 may include a smartphone, a tablet computer, or a laptop computer. The personal device may be communicatively coupled to the onboard computer 131 by a communication medium such as a Bluetooth® link, or a near field communication (NFC) link. The personal device may also be wirelessly connected to other devices such as the roadside unit 135 and the server computer 150.

The roadside unit 135 can be provided in various forms such as, for example, in the form of electronics housed inside a curbside enclosure or in an enclosure that is mounted upon a fixture (pole, pillar, building wall, etc.). In an exemplary embodiment, the roadside unit 135 can be configured to operate as an Internet-of-Things (IoT) element. The roadside unit 135 may be communicatively coupled not only to the onboard computer 131 but to various other devices such as the server computer 150 (via a communication link 137 and the network 140). The communication link 137 may be implemented by using various transmission media such as a coaxial cable, a fiberoptic cable, or a wireless link. In at least some applications, the roadside unit 135 may be configured to communicate with, and/or control, the traffic lights at the traffic intersection 170.

In an exemplary implementation in accordance with the disclosure, the roadside unit 135 transmits to the onboard computer 131 a traffic light timing signal that provides information about various timing characteristics of the various traffic lights at the traffic intersection 170. For example, the traffic light timing signal can provide information such as how long the traffic light 120 will remain in a current condition (a red state, a yellow state, and/or a green state) or how much time is remaining before the traffic light 120 turns from a red state to a green state. In an exemplary embodiment, the traffic light timing signal provided by the roadside unit 135 to the onboard computer 131 can be a signal phase and timing (SPaT) signal. In one exemplary implementation, the onboard computer 131 may use the SPaT signal to operate a countdown timer. The countdown timer may be displayed on a display screen of an infotainment system 132 that is mounted on a dashboard of the automobile 130 or on a display screen of a personal device carried by a driver or a passenger of the automobile 130. The countdown timer may indicate a number of seconds before the traffic light 120 transitions out of a red state to a green state for example.

The onboard computer 131 may ensure that the timing information displayed on the display screen corresponds to the traffic light 120 that is relevant to the lane 160 in which the automobile 130 is currently stopped, rather than for example, the traffic light 115 that controls traffic flow in the right turn only lane 155. The onboard computer 131 may also ensure that the timing information displayed on the display screen corresponds to a different traffic light if the automobile 130 is in a stopped condition in a different lane. For example, the displayed timing information can correspond to the traffic light 115 if the automobile 130 were stopped in the right-turn only lane 155. The timing characteristics of the traffic light 115 can be different than that of the traffic light 120 in accordance with traffic rules that apply to the right-turn only lane 155 (for example, no turn on red, turn on red allowed, yield to oncoming traffic, etc.).

The onboard computer 131 may select the appropriate traffic light (such as the traffic light 120 or the traffic light 115) after verifying that the automobile 130 is in a stopped condition at the traffic intersection 170. In an exemplary case, the onboard computer 131 may determine the stopped condition of the automobile 130 from one or more components of the automobile such as an engine controller, a brake pedal, an accelerator pedal, and an engine operating sensor. In one case, the onboard computer 131 may identify the specific lane in which the automobile 130 is stopped by using one or more devices such as an onboard detection system (not shown) that may include various types of sensors, imaging devices, and/or a global positioning system (GPS) device.

In addition to transmitting the traffic light timing signal to the onboard computer 131, the roadside unit 135 may also transmit to the onboard computer 131, a wireless signal that includes a traffic intersection map. The traffic intersection map provides details about a topography of the traffic intersection 170 at which the automobile is in the stopped condition. The onboard computer 131 may use the traffic intersection map to determine which traffic light is applicable to the lane in which the automobile 130 is stopped. In the exemplary situation shown in FIG. 1, the onboard computer 131 may use the traffic intersection map to determine that the traffic light 120 is the one that is applicable to the lane 160 in which the automobile 130 is stopped.

The onboard computer 131 may then use timing information contained in the traffic light timing signal pertaining to the traffic light 120. The timing information associated with the traffic light 120 may be used in various ways in accordance to the disclosure. In one embodiment, the onboard computer 131 may operate the countdown timer in accordance with an amount of time remaining before the traffic light 120 changes to a green state. The countdown timer thus provides a time window during which the onboard computer 131 can execute some operations in accordance with the disclosure. One such operation involves displaying visual content on the display screen of the infotainment system 132 (or smartphone). The visual content may include items such as a text message, a safety alert message, a notification, an image, an icon, or an advertisement. Some of these items such as a weather alert, a traffic alert, a police alert, or an emergency vehicle alert may be more important to a driver of the automobile 130 than other items such as an advertisement. Consequently, the onboard computer 131 may apply a priority scheme upon at least some of the visual content. For example, the onboard computer 131 may assign a top priority rating to an alert and a lower priority rating to an advertisement. The priority rating may be applied in various ways such as by using labels (high, medium, low, etc.), numbers (1 out of 10, 9 out of 10 etc.), or a star rating (5 stars, two stars etc.).

The onboard computer 131 may use the priority scheme to determine an order in which the visual content is displayed on the display screen of the infotainment system 132 (or smartphone) within a time period defined by the time window that may be indicated in the form of a countdown by the countdown timer. Lower order priority visual content may be displayed when higher order priority items are not present. For example, an advertisement may be displayed when no alerts or notifications are present in the visual content.

In an example implementation, some or all of the visual content may be provided to the onboard computer 131 by the roadside unit 135 and/or the server computer 150. In another example implementation, some or all of the visual content may be originated by the onboard computer 131 such as, for example, text messages and other items received on the personal device of the driver of the automobile 130.

The visual content provided by the roadside unit 135 can be based on lane-specific information such as advertisements for businesses (such as a store 105 or a restaurant 110) that are accessible after the automobile 130 crosses the traffic intersection 170 along the lane 160. The onboard computer 131 may ignore certain received advertisements, such as advertisements for the store 105 and/or the restaurant 110, if the automobile 130 is stopped in the right-turn only turn lane 155. In this situation, the onboard computer 131 may display some advertisements for businesses located elsewhere along a route that the automobile 130 may take after making the right turn from the right-turn only lane 155.

In accordance with the disclosure, the onboard computer 131 is configured to stop displaying the visual content on the display screen of the infotainment system 132 (or smartphone) before the traffic light 120 turns green. In one exemplary implementation, the onboard computer 131 is configured to stop displaying the visual content on the display screen of the infotainment system 132 (or smartphone) just before the traffic light 120 turns from red to green. The amount of time provided before the traffic light 120 turns from red to green allows the driver of the automobile 130 to look away from the display screen and get ready to move forward when the traffic light 120 turns green.

Figure 2:
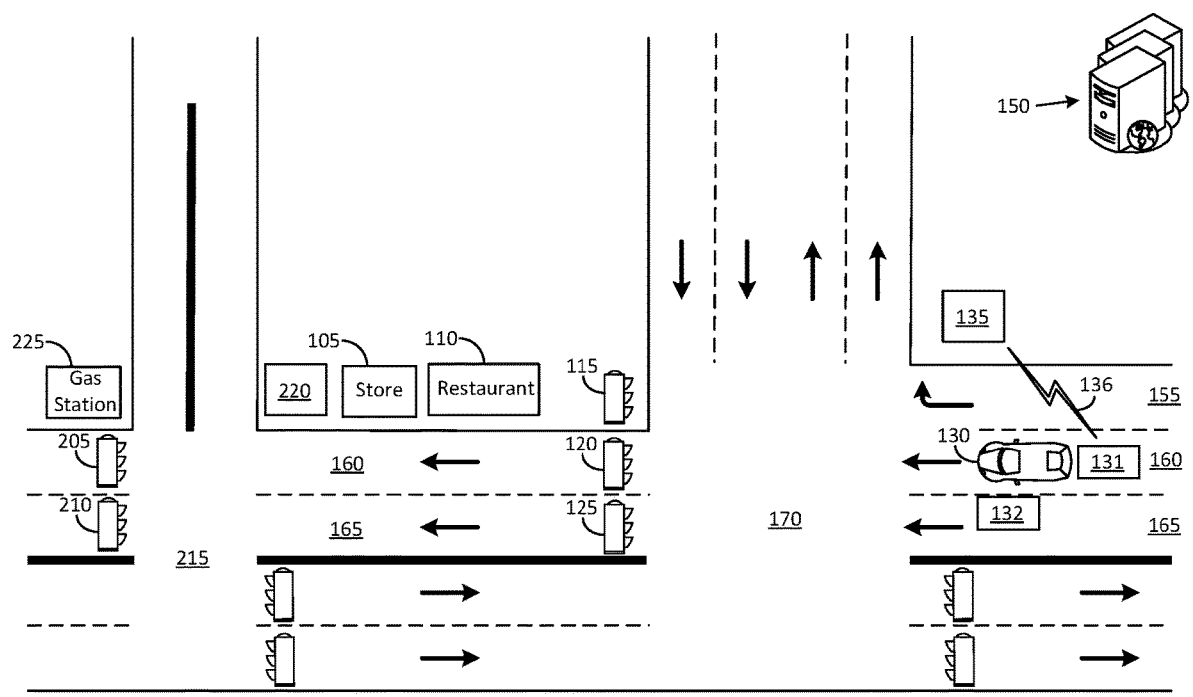
FIG. 2 shows another exemplary embodiment of a system for displaying visual content on one or more devices provided in an automobile, in accordance with the disclosure.

FIG. 2 shows another exemplary embodiment of the system 100 in accordance with the disclosure. In the illustrated situation, the automobile 130 is stopped at the traffic intersection 170 and the roadside unit 135 wirelessly communicates with the onboard computer 131 for displaying visual content during the time window when the traffic light 120 has not yet transitioned to a green state. After the traffic light 120 turns green, the automobile 130 may continue onwards in the lane 160 and reach another traffic intersection 215. A roadside unit 220 located at the traffic intersection 215 may be configured to operate in a similar manner to the roadside unit 135 that is located at the traffic intersection 170. In this exemplary embodiment, the roadside unit 220 is communicatively coupled to the roadside unit 135 and the server computer 150. The communicative coupling may be provided by the use of a communication medium such as a coaxial cable, a fiberoptic cable, or a wireless link.

In an exemplary mode of operation, the roadside unit 135 may receive information from the roadside unit 220 (and/or the server computer 150) about visual content that may be applicable to the traffic intersection 215. For example, the roadside unit 220 (and/or the server computer 150) may provide to the roadside unit 135, information about a gas station 225 located near the traffic intersection 215. The roadside unit 135 may pass on the information to the onboard computer 131, which may then display the information on a display screen of the infotainment system 132 (or smartphone). The driver may see the notification and decide to use the provided information to refuel the automobile 130 at the gas station 225.

In one case, the information of the gas station 225 that is provided to the onboard computer 131 by the roadside unit 135 may be based on a query transmitted from the onboard computer 131 to the roadside unit 135 during the time window when the traffic light 120 has not changed to the green state. The query may be originated by the driver of the automobile 130 upon noticing that the automobile 130 is low on fuel when stopped at the traffic intersection 170.

The roadside unit 220 may execute various operations described above in accordance with the disclosure, if the automobile 130 has stopped at the traffic intersection 215 due to the traffic light 205 being in a red state (or if the traffic light 210 is in a red state and the automobile 130 has changed lanes and is stopped in the lane 165 at the traffic intersection 215).

In some implementations, the roadside unit 135 may have a handshake arrangement with the roadside unit 220, which may include executing a hand-off action by the roadside unit 135 to the roadside unit 220 before the automobile 130 reaches the traffic intersection 215. The hand-off action by the roadside unit 135 to the roadside unit 220 may allow for a sequential mode of operation in some cases. For example, a video clip that is displayed on a display screen of the infotainment system 132 when the automobile is stopped at the traffic intersection 170 and discontinued at a certain point because the traffic light 120 turned green, may be resumed on the display screen of the infotainment system 132 if the automobile 130 has stopped at the traffic intersection 215 due to the traffic light 205 being in a red state.

Figure 3:
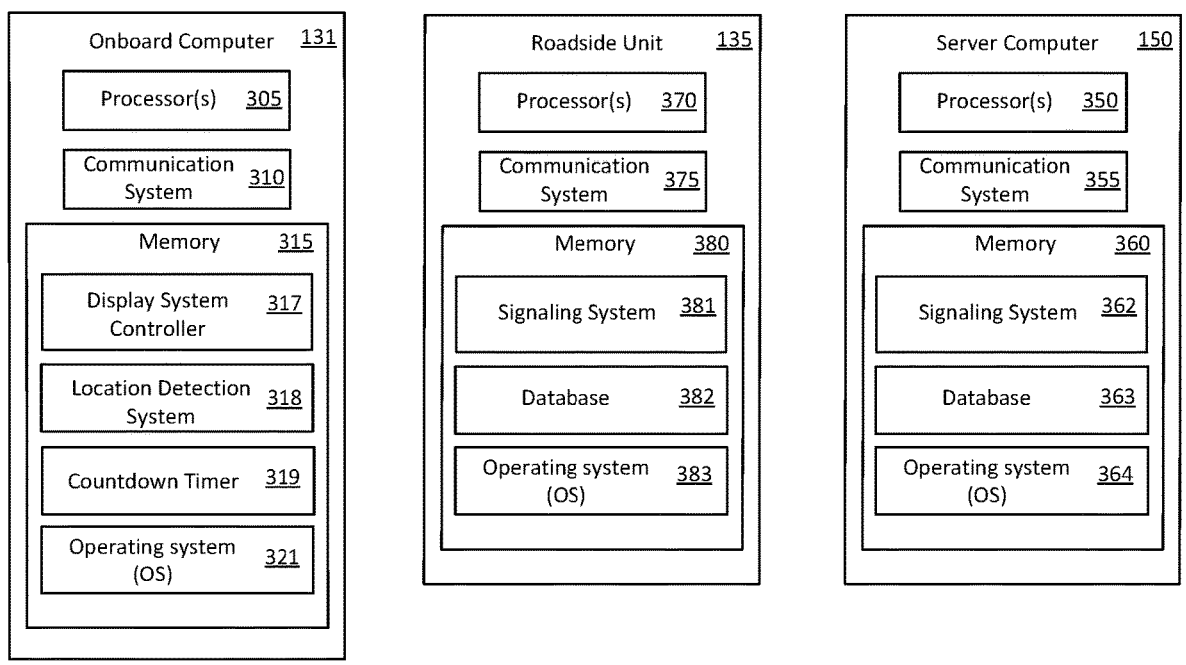
FIG. 3 shows some exemplary components that may be included in some of the elements of a system in accordance with exemplary embodiments of the disclosure.

FIG. 3 shows some exemplary components that may be included in some of the elements of the system 100 such as the onboard computer 131, the roadside unit 135, and the server computer 150. The onboard computer 131 may include a processor 305, a communication system 310, and a memory 315. The communication system 310 can include a wireless transceiver that allows the onboard computer 131 to transmit/receive various items (messages, visual content, etc.) to/from the roadside unit 135, the roadside unit 220, and/or the server computer 150. For example, the wireless transceiver may allow the onboard computer 131 to communicate with the roadside unit 135 (and the roadside unit 220) using a vehicle-to-everything (V2X) communication format. The wireless transceiver may also allow the onboard computer 131 to communicate with the server computer 150 using an Internet communications format (when the network 140 is the Internet) and/or a cellular communications format (when the network 140 is a cellular network).

The memory 315, which is one example of a non-transitory computer-readable medium, may be used to store an operating system (OS) 321, and code modules such as a display system controller 317, a location detection system 318, and a countdown timer 319. The code modules are provided in the form of computer-executable instructions that can be executed by the processor 305 for performing various operations in accordance with the disclosure.

The display system controller 317 code module may be executed by the processor 305 for performing operations such as determining that the automobile 130 is in a stopped condition. The onboard computer 131 may interact with various hardware components of the automobile 130, such as an engine controller, a brake pedal, an accelerator pedal, and an engine operating sensor, to make the determination. The display system controller 317 code module may also be executed by the processor 305 for performing operations such as determining a location of the automobile 130 (such as at a location such as in the lane 160 at the traffic intersection 170) and displaying visual content upon a display screen of the infotainment system 132 during the time window when the traffic light 120 has not yet turned green.

The location detection system 318 may be executed by the processor 305 in cooperation with various hardware components of the automobile 130 (such as a GPS device), and/or by using a traffic intersection map contained in a traffic intersection map signal received by the communication system 310 from the roadside unit 135.

The countdown timer 319 may be executed by the processor 305 in accordance with timing information contained in a traffic light timing signal received by the communication system 310 from the roadside unit 135.

The roadside unit 135 may include a processor 370, a communication system 375, and a memory 380. The communication system 375 can include a wireless transceiver that allows the roadside unit 135 to transmit/receive various items (messages, visual content, etc.) to/from the roadside unit 135 and/or the server computer 150. For example, the wireless transceiver may allow the roadside unit 135 to communicate with the onboard computer 131 using a vehicle-to-everything (V2X) communication format. The wireless transceiver may also allow the roadside unit 135 to communicate with the server computer 150 using an Internet communications format (when the network 140 is the Internet) and/or a cellular communications format (when the network 140 is a cellular network).

The memory 380, which is another example of a non-transitory computer-readable medium, may be used to store an operating system (OS) 383, a database 382, and code modules such as a signaling system 381. The signaling system 381 code module may be executed by the processor 370 for performing operations such as transmitting a traffic light timing signal and a traffic intersection map signal to the onboard computer 131 of the automobile 130 and other such onboard computers in other automobiles. In an exemplary implementation, the traffic light timing signal and/or the traffic intersection map signal may be based on data received from the server computer 150. Such data and other content may be stored in the database 382 for use by the processor 370 to execute various functions.

The server computer 150 may include a processor 350, a communication system 355, and a memory 360. The communication system 355 can include a wireless transceiver that allows the server computer 150 to transmit/receive various items (messages, visual content, etc.) to/from the roadside unit 135 and/or the onboard computer 131. For example, the wireless transceiver may allow the server computer 150 to communicate with the onboard computer 131 using a vehicle-to-everything (V2X) communication format. The wireless transceiver may also allow the server computer 150 to communicate with the roadside unit 135 (and other road units) using an Internet communications format (when the network 140 is the Internet) and/or a cellular communications format (when the network 140 is a cellular network).

The memory 360, which is yet another example of a non-transitory computer-readable medium, may be used to store an operating system (OS) 364, a database 363, and code modules such as a signaling system 362. The signaling system 362 code module may be executed by the processor 350 for performing operations such as transmitting a traffic light timing signal and/or a traffic intersection map signal to the onboard computer 131 of the automobile 130 and other such onboard computers in other automobiles. The signaling system 362 code module may also be executed by the processor 350 for transmitting data associated with a traffic light timing signal and/or a traffic intersection map signal to the roadside unit 135 and other roadside units. In one exemplary implementation the data associated with the traffic light timing signal and/or the traffic intersection map signal may be fetched by the processor 350 from the database 363 or from cloud storage and then transmitted to the roadside unit 135.

Figure 4:
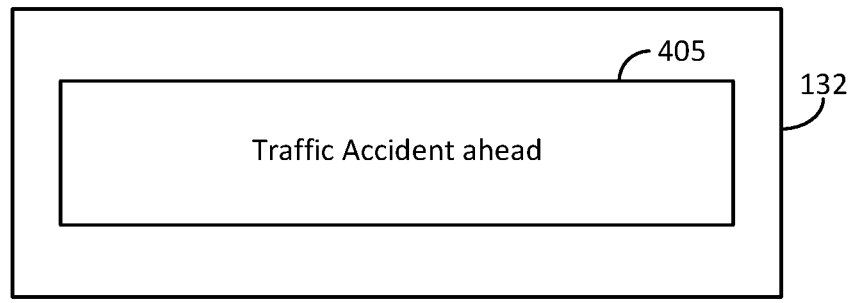
FIG. 4 shows a first example of visual content that may be displayed on a display screen of a device, in accordance with an embodiment of the disclosure.

FIG. 4 illustrates a notification that may be displayed on a display screen 405 of the infotainment system 132 in accordance with the disclosure. The notification, which is shown in the form of a text in this example, may be provided a "high" priority rating by the onboard computer 131 and displayed during the time window when the traffic signal 120 has not yet transitioned to a green state and other visual content available for display on the display screen 405 have lower priority.

Figure 5:
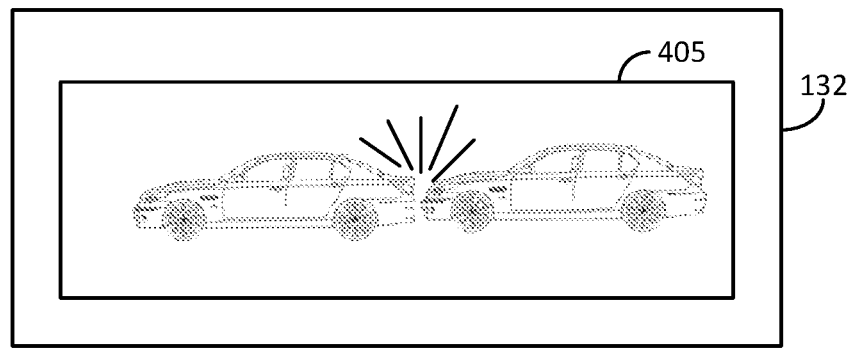
FIG. 5 shows a second example of visual content that may be displayed on a display screen of a device, in accordance with an embodiment of the disclosure.

FIG. 5 illustrates an image that may be displayed on the display screen 405 of the infotainment system 132 in accordance with the disclosure. The image may be displayed during the time window when the traffic signal 120 has not yet transitioned to a green state and other visual content available for display on the display screen 405 have lower priority.

Figure 6:
FIG. 6 shows a third example of visual content that may be displayed on a display screen of a device, in accordance with an embodiment of the disclosure.

FIG. 6 illustrates an advertisement that may be displayed on the display screen 405 of the infotainment system 132 in accordance with the disclosure. The advertisement may be displayed during the time window when the traffic signal 120 has not yet transitioned to a green state and only when no other visual content has a higher priority.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 315, the memory 360, and the memory 380, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   receiving, by an onboard computer of an automobile, a first wireless signal comprising timing information about a first traffic light that is located at a traffic intersection;
   verifying, by the onboard computer, that the automobile is in a stopped condition; and
   executing, by the onboard computer and based on the timing information and verifying that the automobile is in the stopped condition, one or more operations on at least one of an infotainment system located in the automobile or a personal device carried by an occupant of the automobile, wherein executing the one or more operations comprises:
      displaying, based on verifying that the automobile is in the stopped condition, a first object on a display screen of the at least one of the infotainment system or the personal device;
      discontinuing displaying the first object based on a determination that a brake is released; and
      displaying a second object on the display screen.

2. The method of claim 1, wherein the first wireless signal is a Signal Phase and Timing (SPaT) signal and the one or more operations includes displaying at least one of a text message, a safety alert message, a notification, an image, an icon, or an advertisement upon the display screen, wherein each of the text message, the safety alert message, the notification, the image, the icon, and the advertisement is assigned a priority level, and wherein the advertisement is assigned a lower priority level than at least the safety alert message.

3. The method of claim 2, wherein the at least one of the text message, the safety alert message, the notification, the image, the icon, or the advertisement is contained in a second wireless signal received by the onboard computer of the automobile.

4. The method of claim 3, wherein the second wireless signal is an infrastructure-to-vehicle (I2V) message transmitted by at least one of a roadside unit that is configured to operate using a vehicle-to-everything (V2X) protocol or a server computer configured to operate using a cellular communications protocol.

5. The method of claim 2, wherein the timing information about the first traffic light comprises information about an amount of time remaining before the first traffic light transitions to a green state and wherein the first wireless signal further includes a traffic intersection map that provides details about a topography of the traffic intersection at which the automobile is in the stopped condition.

6. The method of claim 5, further comprising:
   utilizing, by the onboard computer, the traffic intersection map and the information about the amount of time remaining before the first traffic light transitions to the green state to discontinue displaying of the at least one of the text message, the safety alert message, the notification, the image, the icon, or the advertisement upon the display screen of the at least one of the infotainment system or the personal device before the first traffic light transitions to the green state.

7. A method comprising:
   receiving, by an onboard computer of an automobile, a first wireless signal comprising information about an amount of time remaining before a traffic light transitions to a green state;
   verifying, by the onboard computer, that the automobile is in a stopped condition; and
   utilizing, by the onboard computer, based on verifying that the automobile is in the stopped condition, the amount of time remaining to execute one or more operations;
   executing, by the onboard computer, the one or more operations, wherein executing the one or more operations comprises:
      displaying, based on verifying that the automobile is in the stopped condition, a first object on a display screen of a device located in the automobile;
      discontinuing displaying the first object based on a determination that the information about the amount of time remaining before the traffic light transitions to the green state; and
      displaying a second object on the display screen.

8. The method of claim 7, wherein the first wireless signal is a Signal Phase and Timing (SPaT) signal and the one or more operations includes displaying an object upon the display screen.

9. The method of claim 8, wherein the device located in the automobile is an infotainment system and the object displayed upon the display screen of the infotainment system includes at least one of a text message, a safety alert message, a notification, an image, an icon, or an advertisement, wherein each of the text message, the notification, the image, the icon, and the advertisement is assigned a priority level, and wherein the advertisement is assigned a lower priority level than at least the safety alert message.

10. The method of claim 8, further comprising:
    utilizing, by the onboard computer, the information about the amount of time remaining before the traffic light transitions to the green state to discontinue displaying of the object upon the display screen of the device before the traffic light transitions to the green state.

11. The method of claim 10, further comprising:
discontinuing, by the onboard computer, displaying of the object upon the display screen of the device prior to an expiry of a time window provided by a countdown timer operating in accordance with the amount of time remaining before the traffic light transitions to the green state.

12. The method of claim 7, wherein the first wireless signal is a Signal Phase and Timing (SPaT) signal and the method further comprises:
receiving, by the onboard computer, a second wireless signal comprising at least one of a text message, a safety alert message, a notification, an image, an icon, or an advertisement;
determining, by the onboard computer, that the automobile is in the stopped condition in one of a first lane or a second lane of a multi-lane road;
displaying, by the onboard computer, the at least one of the text message, the safety alert message, the notification, the image, the icon, or the advertisement upon the display screen, if the automobile is in the stopped condition in the first lane; and
withholding, by the onboard computer, displaying of the at least one of the text message, the safety alert message, the notification, the image, the icon, or the advertisement upon the display screen, if the automobile is in the stopped condition in the second lane.

13. A system comprising:
an onboard computer located in an automobile, the onboard computer comprising:
at least one memory that stores computer-executable instructions; and
at least one processor configured to access the at least one memory and execute the computer-executable instructions to at least:
receive a first wireless signal comprising timing information about a first traffic light that is located at a traffic intersection;
verify that the automobile is in a stopped condition; and
execute, based on the timing information and based on verifying that the automobile is in the stopped condition, one or more operations upon an infotainment system located in the automobile, wherein executing the one or more operations comprises:
displaying, based on verifying that the automobile is in the stopped condition, a first object on a display screen of the infotainment system;
discontinuing displaying the first object based on a determination that a brake is released; and
displaying a second object on the display screen.

14. The system of claim 13, wherein the first wireless signal includes a Signal Phase and Timing (SPaT) signal that provides the timing information about the first traffic light and further includes a traffic intersection map of the traffic intersection at which the automobile is in the stopped condition.

15. The system of claim 14, further comprising:
at least one of a roadside unit or a server computer configured to wirelessly transmit to the onboard computer, an infrastructure-to-vehicle (I2V) message, the I2V message including at least one of a safety alert message, a notification, an image, an icon, or an advertisement for displaying upon the display screen.

16. The system of claim 15, wherein the timing information about the first traffic light comprises information about an amount of time remaining before the first traffic light transitions to a green state and wherein the at least one memory further includes the computer-executable instructions to:
discontinue displaying of the at least one of the safety alert message, the notification, the image, the icon, or the advertisement upon the display screen of the infotainment system before the first traffic light transitions to the green state.

17. The system of claim 16, wherein the at least one memory further includes the computer-executable instructions to:
determine that the automobile is in the stopped condition in one of a first lane or a second lane of a multi-lane road;
display the at least one of the safety alert message, the notification, the image, the icon, or the advertisement upon the display screen of the infotainment system if the automobile is stopped in the first lane; and
withhold displaying of the at least one of the safety alert message, the notification, the image, the icon, or the advertisement upon the display screen of the infotainment system if the automobile is stopped in the second lane.

18. The system of claim 17, wherein the second lane is a turn-only lane.

* * * * *